United States Patent
Linderoth et al.

(10) Patent No.: US 7,482,082 B2
(45) Date of Patent: Jan. 27, 2009

(54) ELECTROCHEMICAL CELL AND A METHOD FOR THE MANUFACTURE THEREOF

(75) Inventors: Søren Linderoth, Roskilde (DK); Søren Primdahl, Slangerup (DK)

(73) Assignee: Forskningsventer Risø (DK)

(*) Notice: Subject to any disclaimer, the term of this patent is extended or adjusted under 35 U.S.C. 154(b) by 526 days.

(21) Appl. No.: 10/406,515

(22) Filed: Apr. 3, 2003

(65) Prior Publication Data

US 2003/0232249 A1    Dec. 18, 2003

(51) Int. Cl.
*H01M 8/10* (2006.01)

(52) U.S. Cl. .............. 429/30; 429/27; 429/28; 429/29; 429/33

(58) Field of Classification Search ............. 429/209
See application file for complete search history.

(56) References Cited

U.S. PATENT DOCUMENTS

| | | | |
|---|---|---|---|
| 4,490,444 A * | 12/1984 | Isenberg ............... | 429/31 |
| 5,106,706 A * | 4/1992 | Singh et al. ............ | 429/31 |
| 5,510,749 A | 4/1996 | Arimoto | |
| 5,531,019 A | 7/1996 | Taira et al. ............ | 29/623.5 |
| 5,629,103 A * | 5/1997 | Wersing et al. ........ | 429/33 |
| 5,726,944 A | 3/1998 | Pelley, III et al. | |
| 5,729,172 A | 3/1998 | Tsukada | |
| 5,973,546 A | 10/1999 | Le et al. | |
| 6,212,107 B1 | 4/2001 | Tsukada | |
| 6,236,581 B1 | 5/2001 | Foss et al. | |
| 6,259,635 B1 | 7/2001 | Khouri et al. | |
| 6,436,565 B1 * | 8/2002 | Song et al. ............ | 429/31 |

FOREIGN PATENT DOCUMENTS

| | | |
|---|---|---|
| EP | 0 407 181 | 7/1990 |
| EP | 0 615 299 A1 | 3/1994 |
| JP | 3-147264 | 10/1989 |
| JP | 3-222206 | 1/1990 |
| JP | 4-190564 | 11/1990 |
| JP | A-H 7240215 | 2/1994 |
| JP | 10-12247 | 6/1996 |
| JP | 11073982 | 8/1997 |
| JP | A-H11-345619 | 6/1998 |

OTHER PUBLICATIONS

US 5,612,921, 03/1997, Chang et al. (withdrawn)

* cited by examiner

*Primary Examiner*—Patrick Ryan
*Assistant Examiner*—Cynthia Lee
(74) *Attorney, Agent, or Firm*—Brinks Hofer Gilson & Lione

(57) ABSTRACT

Electrochemical cell, such as an SOFC, comprising a porous solid electrode (2) in contact with an electrolyte (1), which has been treated so as to become gasproof before the electrode is applied. According to the invention, this contact has been mechanically improved by sintering anchoring particles (3) of for instance $TiO_2$ onto the electrolyte (1). Subsequently, the electrode (2) can be sintered thereon at a temperature lower than hitherto known while still obtaining a sufficient, mechanical attachment in the contact. The latter lowering of the process temperature results in an improved efficiency of the electrode (2), and it allows the use of electrodes which are usually reactive towards the electrolyte at comparatively higher process temperatures.

3 Claims, 4 Drawing Sheets

ELECTROCHEMICAL CELL AND A METHOD FOR THE MANUFACTURE THEREOF

This application claims the benefit of Denmark Patent Application No. PA 2000 01482, filed Oct. 5, 2000, and PCT Application No. WO 02/29919. filed Oct. 2, 2001.

TECHNICAL FIELD

The invention relates to an electrochemical cell comprising an electrolyte and a porous electrode.

BACKGROUND ART

A common feature of such electrochemical cells is the interface between the ceramic surface of the electrolyte and the ceramic/metallic/composite electrode must meet two vital criteria, viz. a) mechanical integrity; and b) electronic and/or ionic contact.

The requirement to mechanical integrity is essentially based on the fact that the electrode must not let go of the electrolyte. Typically, electrodes can be applied onto electrolytes by way of wet-ceramic processes followed by a sintering, or by way of rather advanced methods, such as CVD, laser ablation etc at an increased temperature. The two materials are joined at a temperature referred to as the process temperature below. It is often advantageous to use a relatively high process temperature because such a temperature results in a good mechanical adhesion through a reaction between the two materials.

When the unit is cooled or heated, mechanical stresses arise between the electrode and the electrolyte irrespective of the applying method unless said electrode and said electrolyte present exactly the same thermal coefficient of expansion. These stresses escalate at the same rate as the temperature differs from the process temperature, and therefore these stresses are strongest at low temperatures, such as at room temperature.

Another type of mechanical stresses between the electrode and the electrolyte is caused by volumetric changes of specific metals/metal oxides in connection with a change in the oxygen partial pressure $pO_2$ of the atmosphere at the operating temperature. The volume of many metal oxides is changed either by releasing or absorbing oxygen concurrently with changes in the oxygen partial pressure, cf. for instance $CeO_2$ expanding reversibly at reduction. Another example is NiO, which is converted into Ni at reduction. The Ni can subsequently be oxidized into NiO.

The requirement to electronic and/or ionic contacts is substantially based on the fact that a charge transfer must be allowed in the electrode or at the interface to the electrolyte, said charge transfer involving ions and electrons. The latter charge transfer can be carried out on the surface of specific types of electrodes, viz. mixed conductors, or along portions of the three-phase limit formed by the interface between the electron conductor, viz. the electrode, the ion conductor, viz. the electrolyte or the ion conductor in the electrode, and the gas phase. In order to optimize the operation of the electrode it is essential to minimize possible losses in connection with the above electrode process. These losses can be electrochemically measured as an electrode overpotential (V), or as an impedance (Ω) called the polarisation resistance of the electrode.

A first cause of loss is formation of nonconductive reaction products at the interface.

Another cause of loss is reduction of the three-phase limit or the electrode face by way of a reduction of the porosity of the electrode.

A third cause is found in loss of conductivity due to a mixing of the two materials, viz. reactivity or reciprocal solubility.

An example of the latter is formation of poorly conducting zirkonates between $(La,Sr)MnO_3$ (=LSM) and Y-stabilized $ZrO_2$ (=YSZ).

Yet another example of the above is reciprocal diffusion and formation of porosities at the interface between Gd-doped $CeO_2$ and YSZ.

Thus it is essential to minimize or completely avoid reactions and formation of reaction products at the interface between the electrode and the electrolyte in order to minimize the polarization resistance. Such formations of reaction products and poor contact surfaces are typically avoided at high temperatures, and accordingly a low process temperature is preferred.

Thus it appears that high applying temperatures are typically required in order to obtain a good mechanical interface. However, in addition it appears that these high temperatures may cause formation of reaction products at the interface, said reaction products reducing the efficiency of the electrode.

The electrodes and the electrolyte can be sintered simultaneously, viz. sintered at the same time, provided such a procedure is allowed in view of the reactivity. As the electrolyte must be tightly sintered, the process temperature is often high, i.e. higer than 1250° C. for YSZ, and only very few of the known electrode materials are suited for a sintering simultaneously with the electrolyte at such high temperatures.

In addition, it is known to increase the mechanical strength of the interface between the electrode and the electrolyte by roughening the usually smooth surface of the electrolyte either by way of a corrugation as described in EP A1 0615299 or by way of a sintering thereon of electrolyte particles. Such a procedure is particularly advantageous in resulting in an increase of the interface and the three-phase limit and consequently of the efficiency of the electrode. Such a roughness must typically exceed the particle size of the electrode layer sintered thereon in order to ensure a substantial anchoring.

However, it is difficult to corrugate a very thin electrolyte, viz. an electrolyte of a thickness of 5 to 25 μm, without causing errors, such as through errors and porosities. Consequently, it is difficult to sinter electrolyte particles onto a tight electrolyte because typically the electrolyte is not sinteringly active. In addition, it is difficult to obtain a tight electrolyte by way of sintering while electrolyte particles are simultaneously sintered thereon, said electrolyte particles projecting from the surface. Typically, such particles cause through errors and porosities.

Another possibility is to increase the sintering temperature until a suitable mechanical anchoring of the electrode material has been obtained provided a predetermined limitation of the efficiency of the electrode is simultaneously accepted.

A third possibility is to apply a third material in form of a continuous, optionally porous membrane on for instance the electrolyte in order to prevent a physical contact with the reactive electrode. However, such a membrane must meet the same requirements with respect to mechanical integrity and electronic and/or ionic contact relative to both the electrode and the electrolyte.

Finally, it is known to laminate a layer of particles of the composition of the electrolyte between the electrolyte and the electrode prior to the first sintering, cf. JP 10012247. However, such a procedure involves a high risk of damaging the electrolyte layer, which is typically of a thickness of 2 to 15 µm corresponding to the dimension of efficient anchoring particles.

BRIEF DESCRIPTIONS OF THE INVENTION

The object of the invention is therefore to provide an electrochemical cell, where a strong mechanical anchoring of the electrode to the surface of the electrolyte has been established without significantly reducing the efficiency of the electrode.

An electrochemical cell of the above type is according to the invention characterised in that a noncovering layer of particles of another composition than the electrolyte is applied and sintered onto a sintered electrolyte. These particles can for instance be applied by way of spraying a suspension thereon. The particles comprise a material being reactive towards the electrolyte to a suitable degree. A sintering of anchoring particles onto the electrolyte results in a very strong anchoring of said particles to the surface of the electrolyte. Subsequently, the electrode can be applied by way of for instance a wet-ceramic process and be attached to the electrolyte by means of the anchoring particles at a process temperature significantly lower than the sintering temperature of the electrolyte and furthermore significantly lower than the temperature necessary in mechanical respect for obtaining a direct sintering of the electrode material onto the electrolyte. The latter low process temperature renders it possible to obtain a limited reactivity between the electrolyte and the electrode material at the portions of said electrolyte not being covered by anchoring particles, and accordingly the electrochemical efficiency of these portions is high. A suitably limited covering of anchoring particles on the electrolyte has the effect that the loss of the active electrolyte surface is compensated for by the improved efficiency of the electrode, said improved efficiency being obtained by a lowering of the process temperature.

According to a particularly advantageous embodiment, the particles are substantially made of $TiO_2$, optionally doped $TiO_2$.

The invention relates also to a method of manufacturing an electrochemical cell comprising an electrolyte and a ceramic electrode. According to the invention, a noncovering layer of another composition than the electrolyte is applied and sintered onto said electrolyte, said procedure being followed by a sintering. As a result, a particularly advantageous method of manufacturing an electrochemical cell is obtained.

A particularly advantageous method of manufacturing an electrochemical cell comprising an electrolyte and a porous electrode, and where a layer of particles of a material of substantially the same composition as the electrode is sintered in said electrode, may be characterised by said particles being sintered at a temperature higher than the temperature used subsequently for sintering the particles onto said electrode.

BRIEF DESCRIPTION OF THE DRAWING

The invention is explained in greater detail below with reference to the accompanying drawings, in which.

BEST MODE FOR CARRYING OUT THE INVENTION

The invention is illustrated below by means of Examples:

EXAMPLE 1

Figure 1:
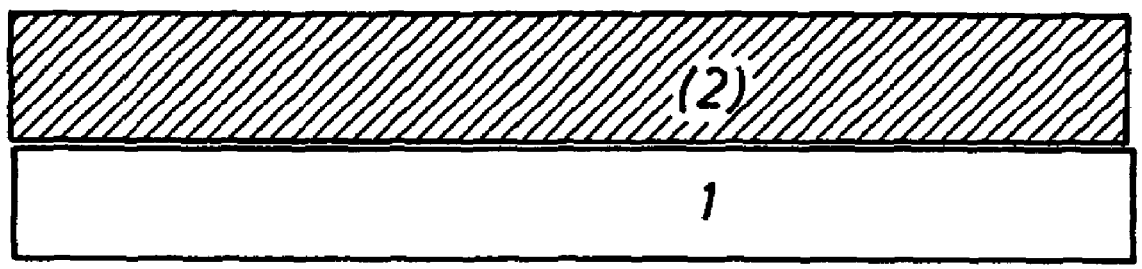
FIG. 1 illustrates a porous electrode on an electrolyte.
Figure 2:
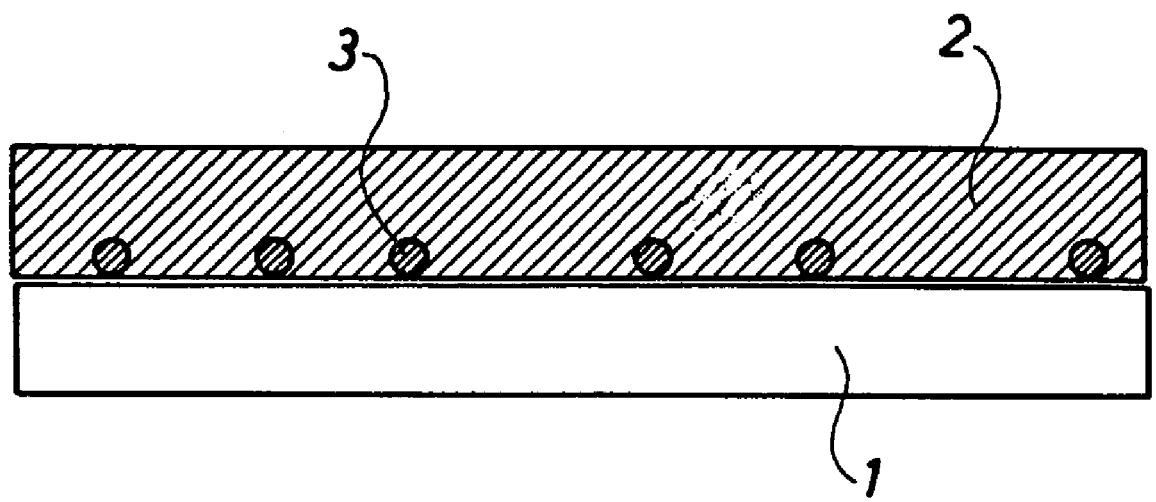
FIG. 2 shows a porous electrode anchored to an electrolyte by means of a noncovering layer of anchoring particles, FIG. 3 illustrate two identical electrodes on an electrolyte, said two electrodes forming a symmetrical cell for characterising the polarisation resistance of the electrodes.
Figure 3:
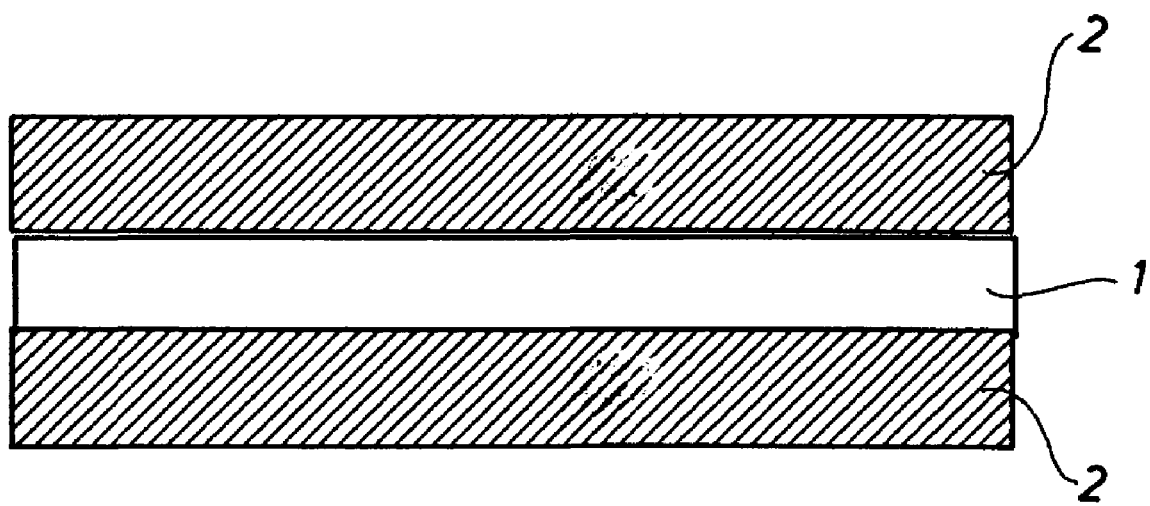

The symmetrical cells of FIG. 3 are manufactured as follows. A noncovering layer of $TiO_2$ anchoring particles is sintered onto electrolyte foils, viz. YSZ with 8% by mole of $Y_2O_3$, =8YSZ, said noncovering layer of $TiO_2$ anchoring particles being produced by ball milling of $TiO_2$-agglomerates and isolation of a particle fraction of approximately 1 to 5 µm through sedimentation.

The foils with anchoring particles sprayed thereon are sintered at 1150° C./2 h, and subsequently a 20 µm porous $Ce_{0.6}Gd_{0.4}O_{1.8}$ (=CGO) electrode is applied in two layers and two sinterings at 1100° C./2 h. Subsequently, the two symmetrical cells are frozen in water on a freezing surface and cut into test pieces of 4 times 4 mm². The test pieces are provided with an Au/CG4 current collector and mounted between Pt grids and auxiliary cells in such a manner that the polarisation resistance $R_p$ of the electrodes can be measured without being affected by diffusion outside the porous electrode structure. The electrodes are characterised by impedance spectroscopy at 700 to 1000° C. in hydrogen with 3% water while subjected to an AC amplitude of 14 mV RMS about an open voltage (ocv).

For comparison, corresponding test pieces are produced with 8YSZ anchoring particles sintered thereon at 1400° C./2 h and tested under the same conditions.

Figure 4:
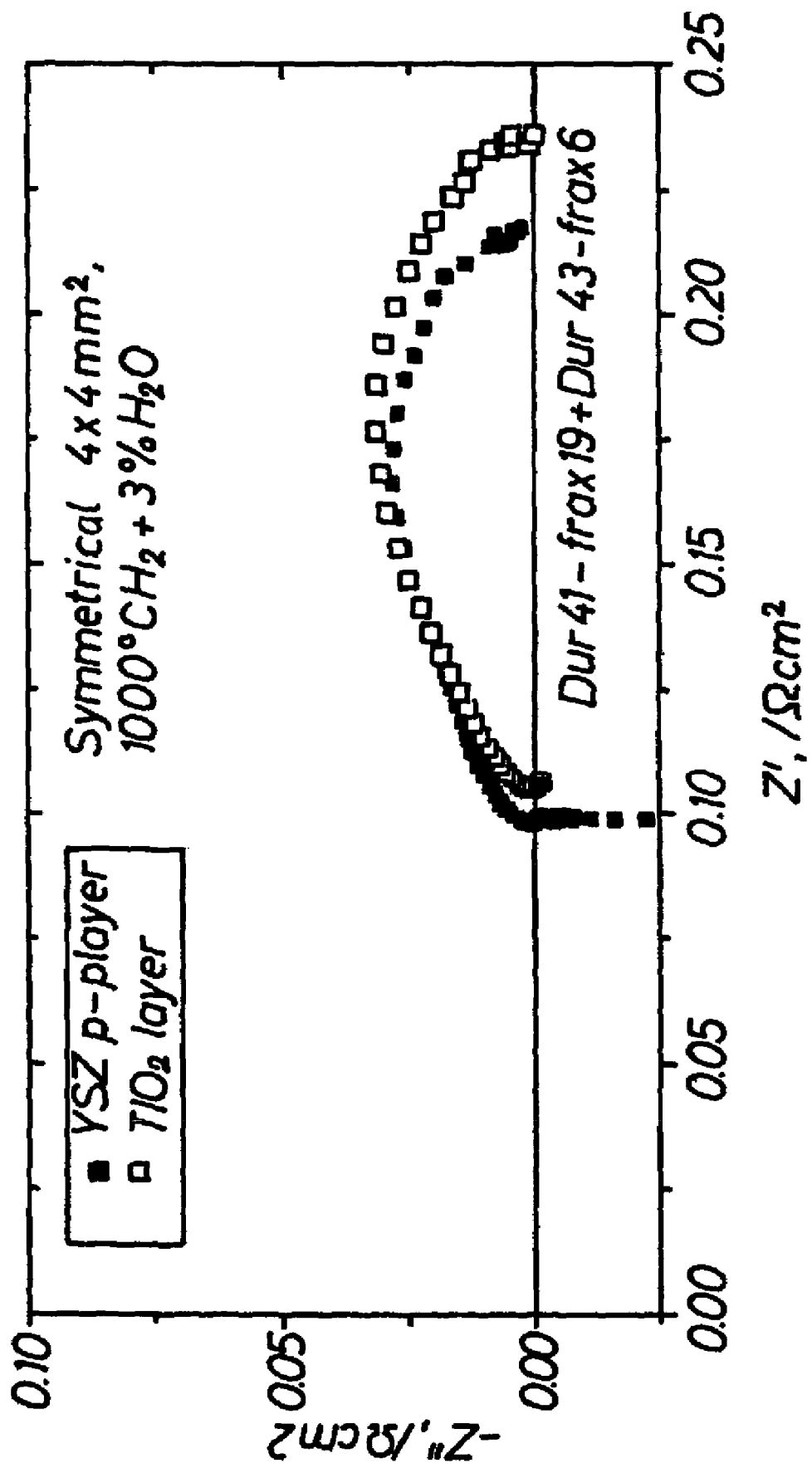
FIG. 4 shows a Nyquist plot of the impedance of a $Ce_{0.6}Gd_{0.4}O_{1.6}$ (=CGO) electrode on a YSZ electrolyte measured with a geometry as shown in FIG. 3, with and without, respectively, a noncovering layer of anchoring particles made of $TiO_2$.

Area-corrected impedance spectra for the two types of electrodes are indicated in the Nyquist-plot in FIG. 4, where the distance between the intersections of the curve and the abscissa indicates the area-specific polarisation resistance Pp.

It appears that the polarization resistance Pp is not significantly increased by the presence of the $TiO_2$ layer. The change is within the degree of accuracy.

Optical pictures are taken of the $TiO_2$ layer after the sintering. The particle layer covers approximately 10% of the surface and the particle size is approximately 2 µm. A few agglomerates of 5 to 7 µm appear.

The attachment of the $TiO_2$ layer is very strong. It is not possible to remove the layer by means of a scalpel, but the upper portions of large agglomerates are, however, removed. Reference pieces with 8YSZ anchoring particles do not present quite the same attachment. Here the particles are easily removed by scraping with a nail.

The Redox stability was examined by subjecting cell fragments (20 times 45 mm²) with $TiO_2$ anchoring particles to a heating to 850° C. in air, shifting to 9% dry $H_2$ for two hours and finally cooling in air to room temperature. No delamination nor descaling of the electrodes appear.

EXAMPLE 2

The symmetrical cells of FIG. 3 are manufactured as follows. A noncovering layer of $TiO_2$ anchoring particles is sprayed onto sintered 8YSZ electrolyte foils, said layer of $TiO_2$ anchoring particles being produced by ball milling of $TiO_2$-agglomerates and isolation of a particle fraction of approximately 5 to 20 µm through sedimentation.

The foils with anchoring particles sprayed thereon are sintered at 1150° C./2 h, and subsequently a 20 µm porous composite LSM/8YSZ electrode is applied in two layers, and two sinterings at 1100° C./2 h are carried out. Subsequently, the two symmetrical cells are frozen in water on a freezing surface and cut into test pieces of 4 times 4 mm². The test pieces are provided with an LSM current collector and mounted between Pt grid. The electrodes are characterised by impedance spectroscopy at 700 to 1000° C. in air while subjected to an AC amplitude of 14 mV RMS about an open voltage (ocv).

For comparison, corresponding test pieces are produced without anchoring particles and tested under the same conditions.

Area-corrected impedance spectra for the two types of electrodes can be indicated in a Nyquist-plot, where the distance between the intersections of the curve and the abscissa indicates the area-specific polarisation resistance.

The polarization resistance is not significantly increased, viz. approximately 10%, by the presence of the $TiO_2$ layer. The change is found at 850° C.

Optical pictures of the $TiO_2$ layer are taken after the sintering. The particle layer covers approximately 15% o the surface and the particle size is approximately 2 to 4 µm.

The invention claimed is:

1. A method of manufacturing an electrochemical cell comprising:
   providing a thin layer of an electrolyte of a thickness of 5 to 25 µm,
   providing a porous electrode,
   applying a layer of particles of another composition than said electrolyte onto the layer of electrolyte, said particles being approximately 2 to 4 µm in size and said layer of particles covering less than approximately 15% of the surface of the electrolyte layer,
   sintering the layer of particles onto the electrolyte,
   applying the electrode onto the electrolyte and the layer of particles, and
   sintering the electrode onto the layer of particles, whereby the electrode is anchored to the electrolyte.

2. Method according to claim 1, characterized by the particle layer covering approximately 10% of the entire surface of the electrolyte layer.

3. Method according to claim 1, characterized by the particle layer covering approximately 15% of the entire surface of the electrolyte layer.

* * * * *

UNITED STATES PATENT AND TRADEMARK OFFICE
CERTIFICATE OF CORRECTION

PATENT NO. : 7,482,082 B2  Page 1 of 1
APPLICATION NO. : 10/406515
DATED : January 27, 2009
INVENTOR(S) : Linderoth et al.

It is certified that error appears in the above-identified patent and that said Letters Patent is hereby corrected as shown below:

In The Title Page item (73),

Assignee: Delete "Forskningsventer Riso (DK)" and add <u>Danmarks Tekniske Universitet (DK)</u>

Signed and Sealed this

Twenty-third Day of June, 2009

JOHN DOLL
*Acting Director of the United States Patent and Trademark Office*